United States Patent
Winkler et al.

(10) Patent No.: US 10,295,557 B2
(45) Date of Patent: May 21, 2019

(54) SENSOR DEVICE FOR A ROLLING BEARING AND ROLLING BEARING ARRANGEMENT COMPRISING SUCH A SENSOR DEVICE

(71) Applicant: Schaeffler Technologies AG & Co. KG, Herzogenaurach (DE)

(72) Inventors: Markus Winkler, Erlangen (DE); Richard Baier, Aurachtal (DE); Sergej Mensch, Schwebheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 8 days.

(21) Appl. No.: 15/553,668

(22) PCT Filed: Feb. 4, 2016

(86) PCT No.: PCT/DE2016/200072
§ 371 (c)(1),
(2) Date: Aug. 25, 2017

(87) PCT Pub. No.: WO2016/138897
PCT Pub. Date: Sep. 9, 2016

(65) Prior Publication Data
US 2018/0045748 A1     Feb. 15, 2018

(30) Foreign Application Priority Data
Mar. 4, 2015   (DE) .................. 10 2015 203 861

(51) Int. Cl.
*F16C 19/00*     (2006.01)
*G01P 3/44*      (2006.01)
(Continued)

(52) U.S. Cl.
CPC .............. *G01P 3/443* (2013.01); *F16C 19/00* (2013.01); *F16C 33/581* (2013.01);
(Continued)

(58) Field of Classification Search
CPC ............................. G01P 3/443; F16C 41/007
See application file for complete search history.

(56) References Cited

U.S. PATENT DOCUMENTS

| | | | |
|---|---|---|---|
| 4,259,637 A | 3/1981 | Bloomfield et al. | |
| 6,094,046 A * | 7/2000 | Message ............. | F16O 33/7886 324/173 |

(Continued)

FOREIGN PATENT DOCUMENTS

| | | |
|---|---|---|
| CN | 1854545 A | 11/2006 |
| CN | 1299016 C | 2/2007 |

(Continued)

OTHER PUBLICATIONS

Machine Translation of JP 2007-16840.*

*Primary Examiner* — Thomas R Hannon
(74) *Attorney, Agent, or Firm* — Reid A. Baldwin

(57) ABSTRACT

Sensor devices for a rolling bearing and roller bearings including said sensors are disclosed. The sensor device may include at least one sensor configured to connect to one bearing race in a manner fixed against relative rotation. At least one signal transmitter may be configured to connect to the other of the bearing races in a manner fixed against relative rotation. The sensor device may further include an outer ring configured to be fastened on an end face of the outer race of the rolling bearing and an inner ring configured to be fastened on an end face of the inner race of the rolling bearing. The sensor and the signal transmitter may be arranged on mutually opposite lateral surfaces of the outer and inner rings.

20 Claims, 1 Drawing Sheet

(51) Int. Cl.
  *G01P 3/486*  (2006.01)
  *G01P 3/487*  (2006.01)
  *G01P 3/488*  (2006.01)
  *F16C 33/58*  (2006.01)

(52) U.S. Cl.
  CPC ............ *F16C 33/583* (2013.01); *G01P 3/486* (2013.01); *G01P 3/487* (2013.01); *G01P 3/488* (2013.01)

(56) References Cited

U.S. PATENT DOCUMENTS

| | | | |
|---|---|---|---|
| 6,655,844 B1 | 12/2003 | Message et al. | |
| 2008/0309322 A1* | 12/2008 | Sentoku | F16C 33/78 324/174 |
| 2010/0135605 A1* | 6/2010 | Ishii | B60B 27/0005 384/448 |
| 2010/0172605 A1 | 7/2010 | Pausch et al. | |
| 2012/0105055 A1* | 5/2012 | Takahashi | F16O 41/007 324/207.25 |

FOREIGN PATENT DOCUMENTS

| | | |
|---|---|---|
| CN | 103080698 A | 5/2013 |
| DE | 60008474 T2 | 11/2004 |
| DE | 69826055 T2 | 9/2005 |
| DE | 102007042478 A1 | 8/2008 |
| DE | 112007000136 T5 | 11/2008 |
| DE | 102009021469 A1 | 11/2010 |
| DE | 112011102924 T5 | 7/2013 |
| DE | 102012202522 A1 | 8/2013 |
| EP | 1251354 A1 | 10/2002 |
| EP | 1557676 A1 | 7/2005 |
| JP | 2007016840 A | 1/2007 |
| JP | 2007121019 A | 5/2007 |
| JP | 2007016840 A | 1/2017 |
| WO | 2009116445 A1 | 9/2009 |
| WO | 2012080780 A1 | 6/2012 |
| WO | 2012140465 A1 | 10/2012 |
| WO | 2014023275 A1 | 2/2014 |

\* cited by examiner

SENSOR DEVICE FOR A ROLLING BEARING AND ROLLING BEARING ARRANGEMENT COMPRISING SUCH A SENSOR DEVICE

CROSS-REFERENCE TO RELATED APPLICATIONS

This application is the U.S. National Phase of PCT Appln. No. PCT/DE2016/200072 filed Feb. 4, 2016, which claims priority to DE 102015203861.0 filed Mar. 4, 2015, the entire disclosures of which are incorporated by reference herein.

TECHNICAL FIELD

The present disclosure relates to a sensor device for a rolling bearing.

BACKGROUND

Rolling bearing arrangements with integrated sensor units, also known as sensor bearings, are used to detect different bearing state variables, e.g. speed, temperature and rotational angle. The disadvantage with the previously known solutions is that such rolling bearing arrangements are generally special products and are thus available only in a certain range of variants.

DE 10 2012 202 522 A1 shows a sensor bearing by means of which operating states within a rolling bearing can be detected and transmitted to a signal receiver. To measure the forces acting on the rolling elements, use is made of at least one pickup, which is arranged in the rolling element cage. The rolling element cage has a number of pockets to accommodate rolling elements. One to four pockets are not fitted with rolling elements, allowing pickups to be arranged instead of the rolling elements. The pickups are connected to the cage in a manner fixed against relative rotation. The disadvantage here is that the reduced number of rolling elements can lead to fluctuating loads in the bearing and to impaired concentricity of running.

DE 10 2009 021 469 A1 describes a sensor bearing unit comprising a rolling bearing designed as a ball roller bearing with a sensor housing arranged on a bearing race and having an integrated sensor device for detecting operating states of the bearing. The sensor housing is designed as an adapter ring resting against a free circumferential surface or an end face of a bearing race. The adapter ring is dimensioned in such a way that the radial dimensions or the axial dimensions of the overall sensor bearing unit are at most equal to those of a ball bearing with the same bearing capacity. This makes it possible to interchange a ball bearing and a ball roller bearing with an integrated sensor device while using the same installation space.

DE 10 2007 042 478 A1 describes a rolling bearing device having a sensor system for generating a sensor signal related to the rotation of the inner race relative to the outer race. The sensor system comprises a sensor element having at least one reed contact, which detects a magnetic signal from the signal transmitter as a sensor signal. The sensor element can be incorporated into a bearing cover ring designed as a flat annular disk. This bearing cover ring is preferably fixed on the bearing race which is stationary in operation. The signal transmitter is fastened on one end of the rolling bearing cage and can be designed as a single permanent magnet or encoder disk.

SUMMARY

One object of the present disclosure may include making available a sensor device which can be attached to a rolling bearing with little effort. The sensor device may be designed in such a way that sensor devices matched to different rolling bearing diameters can be produced with relatively little effort. Moreover, the intention is to make available a rolling bearing arrangement having a sensor device.

To achieve the object according to the disclosure, use is made of a sensor device as described herein.

The sensor device according to the disclosure may be provided for attachment to a rolling bearing. It may include an outer ring, which can be fastened on an axial end face of an outer race of the rolling bearing, and an inner ring, which can be fastened on an axial end face of the inner race of the rolling bearing. The sensor and the signal transmitter may be arranged on mutually opposite lateral surfaces of the outer and inner rings.

One advantage of the sensor device may be that it can be produced with little effort and thus also at low cost. In general, the inner and outer rings are manufactured from an endless profile, thereby making it possible to produce different desired diameters with little outlay. It is therefore possible to stock corresponding sensor devices for different rolling bearing diameters while only the inner and outer rings have to be supplied in the common dimensions. In contrast, the sensors can be of identical design for all the sensor devices and need only be arranged on the corresponding lateral surface of the outer or inner ring. As the signal transmitters it is possible to use encoder rings available commercially as mass-produced articles in different diameters. It is a relatively simple matter to attach the sensor device to a rolling bearing. For this purpose, the outer ring has to be fastened on an end face of the outer race and the inner ring has to be fastened on an end face of the inner race.

According to an embodiment, the sensor or, alternatively, a plurality of sensors is arranged on a flexible circuit board fastened on the lateral surface of the outer or the inner ring. There may also be sensor-electronic components and a power supply on the circuit board. The elements arranged on the circuit board may be connected electrically by conductor tracks. The circuit board may be fixed on the lateral surface by means of potting compound. In this way, the sensitive elements arranged on the circuit board are well protected from moisture and dirt. Moreover, the elements may be fixed in position by means of potting compound, thereby making it possible to achieve the spacings between the sensor or sensors, which are important to functioning, in a reliable process.

According to an embodiment, the outer ring is designed as an open ring. By virtue of the open form of said ring, the outer ring is automatically centered during assembly and additionally also compensates manufacturing tolerances which may occur.

The inner ring may likewise be of a self centering design.

It has proven advantageous if the sensor device can be fastened on the rolling bearing by means of an adhesive film. The adhesive film is wetted with adhesive on both sides to enable a connection to be established between the sensor device and the rolling bearing. In this context, an embodiment of the adhesive film as a means of retention for transportation has proven particularly advantageous. For this purpose, the adhesive film comprises a first circumferential portion in the region of the inner ring and a second circumferential portion in the region of the outer ring. The first and second portions are connected to one another by means of a plurality of parting webs, wherein the parting webs are designed in such a way that they break when there is a force acting in a circumferential direction. In the state as delivered, the inner and outer rings of the sensor device and the inner race and outer race of the rolling bearing are thus fixed relative to one another. After the assembly of the rolling bearing, e.g. on a rotatable element, the parting webs will break during the first attempt at rotation and thereby release the inner race relative to the outer race and, as a result, rotations are then possible.

The inner ring may be embodied as a flinger disk. Reliable removal of dirt and moisture is thereby possible in order to protect the signal transmitter and/or the rolling element space from contaminants.

According to an embodiment, the sensor device comprises a connection cable for connection to an evaluation unit. The connection cable may be fastened on the circuit board. However, there is also the possibility of alternative embodiments in which data transfer to the evaluation unit takes place not via cables but wirelessly, such as via a radio signal, e.g. by Bluetooth.

To achieve the object according to the disclosure, use is furthermore also made of a rolling bearing arrangement.

The rolling bearing arrangement according to the disclosure may comprise a rolling bearing having an outer race and an inner race, wherein one of the two bearing races is rotatable relative to the other of the two bearing races, and comprises a sensor device of the type described above, which is connected to the rolling bearing.

BRIEF DESCRIPTION OF THE DRAWINGS

Embodiments of the disclosure are explained in greater detail below by means of the attached figures, of which.

DETAILED DESCRIPTION

Figure 1:
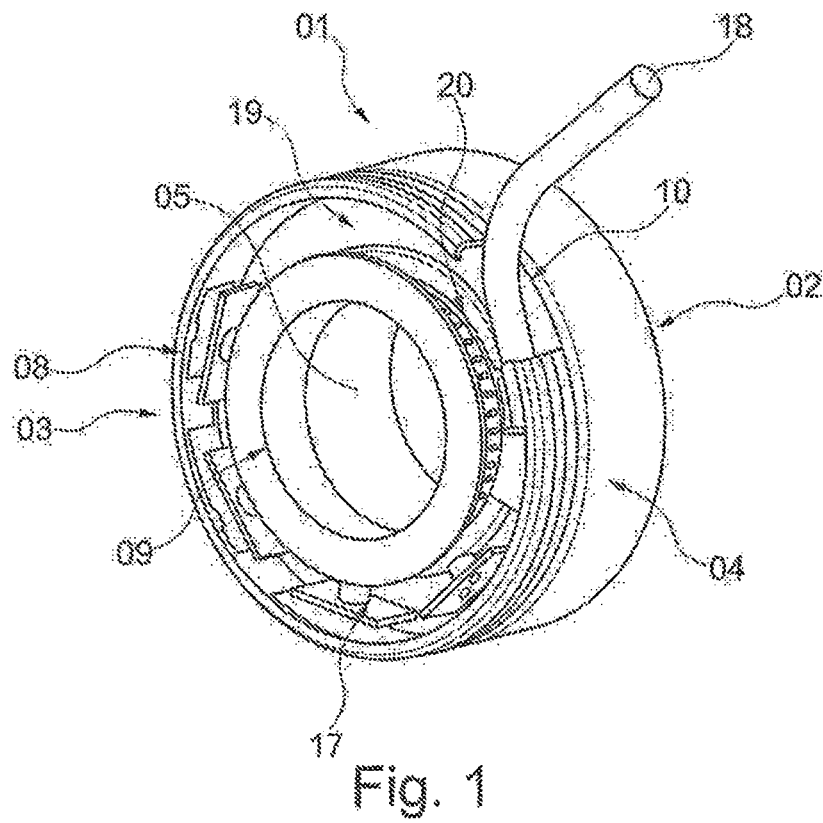
FIG. 1 shows a perspective view of a rolling bearing arrangement according to the disclosure.
Figure 2:
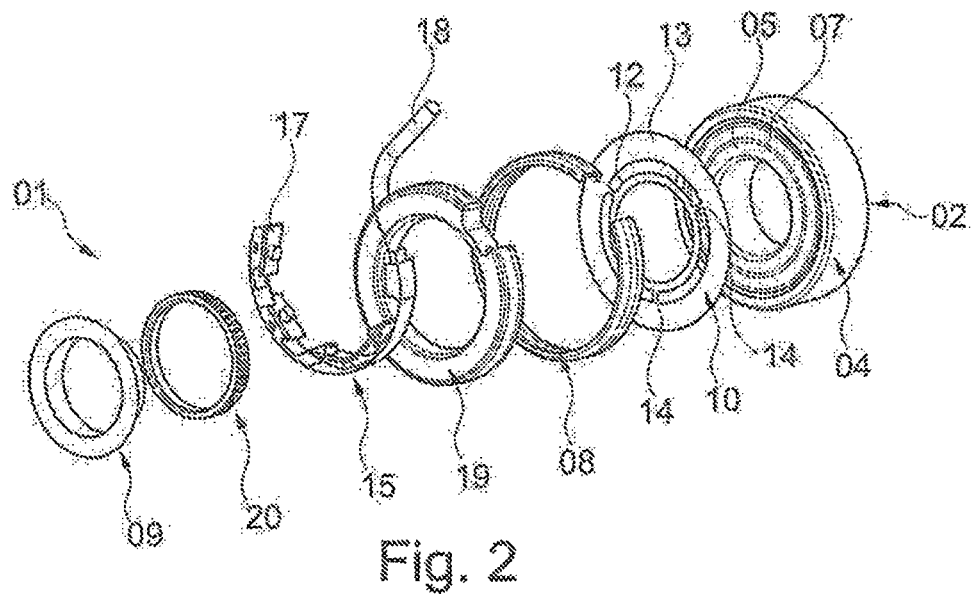
FIG. 2 shows an exploded view of the rolling bearing arrangement according to the disclosure.

FIG. 1 shows a perspective view of a rolling bearing arrangement 01 according to the disclosure, while an exploded view of the rolling bearing arrangement is shown in FIG. 2. The rolling bearing arrangement 01 comprises a rolling bearing 02 and a sensor device 03 fastened thereon. The rolling bearing 02 has at least one outer race 04, one inner race 05 and rolling elements (not shown) arranged in a rolling element space between the outer race 04 and the inner race 05. One of the two bearing races 04, 05 is rotatable relative to the other bearing race. Respective sealing rings 07 may be connected on both sides to the outer race 04, the rings extending in a radial direction between the inner race 05 and the outer race 04. The sealing ring 07 protects the interior of the rolling bearing from contaminants.

The sensor device 03 has an outer ring 08 and an inner ring 09. The diameter of the outer ring 08 may correspond to the diameter of the outer race 04 of the rolling bearing 02, with the result that the outer ring 08 and the outer race 04 at least partially overlap in cross section after assembly. The diameter of the inner ring 09 may correspond to the diameter of the inner race 05 of the rolling bearing 02, with the result that the inner ring 09 and the inner race 04 at least partially overlap in cross section after assembly. The outer and inner rings 08, 09 are designed in such a way that they can bear the required assembly forces without damage.

The outer ring 08 may be fastened on an axial end face of the outer race 04 of the rolling bearing 02. The inner ring 09 may be fastened on an axial end face of the inner race 05. To fasten a sensor device 03 on the rolling bearing 02, use may be made of an adhesive film 10 wetted on both sides with adhesive, e.g. in the form of a polyurethane foam adhesive strip with acrylate adhesive.

The adhesive film 10 may be simultaneously designed as a means of retention during transportation. For this purpose, it comprises a first circumferential portion 12 in the region of the inner ring 09 and a second circumferential portion 13 in the region of the outer ring 08. The first and second portions 12, 13 may be connected to one another by means of a plurality of parting webs 14. The parting webs 14 are designed in such a way that they break when there is a force acting in a circumferential direction and thus release the inner ring 09 with respect to the outer ring 08 and the inner race 05 with respect to the outer race 04, after which rotations are thus possible.

The outer ring 08 may be embodied as an open ring and, as a result, it can self-center during assembly. By virtue of the open C shape of the outer ring 08, it is furthermore possible to compensate manufacturing tolerances.

In the embodiment illustrated, a flexible circuit board 15 is arranged on the inner lateral surface of the outer ring 08. In modified embodiments, the circuit board can also be arranged on the outer lateral surface of the inner ring 09. In general, the circuit board 15 carries various elements 17, namely at least one sensor, the required sensor-electronic components and preferably also a power supply. Of course, it is also possible to use a plurality of sensors to detect different state variables. The elements 17 are connected electrically by conductor tracks. A connection cable 18, which can be connected to an evaluation unit (not shown), may be fastened on the circuit board 15 to enable data to be exchanged between the sensor device 03 and the evaluation unit or to supply power from an external power supply. In alternative embodiments, data exchange with the evaluation unit can also take place wirelessly by radio signal. The cable 18 can preferably be passed to the outside in the region of the missing ring segment of the outer ring 08.

The circuit board 15 may be fastened on the inner lateral surface of the outer ring 08 by means of potting compound 19. In this way, the elements 17 are protected reliably from moisture and dirt. By means of the potting compound 19, the elements 17 are furthermore also fixed in position, thereby making it possible to reliably maintain functionally important spacings between elements, in particular the sensors.

The geometry of the inner ring 09 is expediently likewise embodied so as to be self centering. A signal transmitter 20 may be arranged on the outer lateral surface of the inner ring 09. The signal transmitter 20 may be an encoder ring. Both active and passive encoders can be used. It is possible for the encoder ring 20 to be sensed optically or magnetically. After assembly, the encoder ring 20 lies radially opposite the sensor 17 attached to the circuit board 15, with the result that the sensor senses a relative rotation between the outer and the inner ring. The inner ring 09 may be embodied as a flinger disk. In this way, the signal transmitter 20 and/or the rolling element space can be protected from contaminants.

To avoid axial slippage of the rolling bearing arrangement 01, the assembled rolling bearing 02 may be fixed axially, e.g. by means of an interference fit, a retaining ring or a locknut.

LIST OF REFERENCE SIGNS 01 rolling bearing arrangement
02 rolling bearing
03 sensor device
04 outer race 05 inner race
06 -
07 sealing ring
08 outer ring
09 inner ring
10 adhesive film
11 -
12 first portion of the adhesive film
13 second portion of the adhesive film
14 parting webs of the adhesive film
15 flexible circuit board
16 -
17 elements/sensor
18 connection cable
19 potting compound
20 signal transmitter/encoder ring

The invention claimed is:

1. A sensor device for a rolling bearing having an outer race and an inner race, which is rotatable relative to the outer race, wherein the sensor device comprises:
   at least one sensor configured to connect to one of the two bearing races in a manner fixed against relative rotation,
   at least one signal transmitter configured to connect to the other of the two bearing races in a manner fixed against relative rotation, and,
   wherein the sensor device further comprises a c-shaped outer ring having opposing ends that define a gap, the outer ring configured to be fastened on an end face of the outer race of the rolling bearing, and an inner ring configured to be fastened on an end face of the inner race of the rolling bearing, wherein the sensor and the signal transmitter are arranged on mutually opposite lateral surfaces of the outer and inner rings.

2. The sensor device as claimed in claim 1, wherein the sensor is arranged on a flexible circuit board fastened on the lateral surface of the outer or the inner ring.

3. The sensor device as claimed in claim 2, wherein the circuit board is fixed on the lateral surface by potting compound.

4. The sensor device as claimed in claim 2, wherein said sensor device has a connection cable for connection to an evaluation unit, wherein the connection cable is fastened on the circuit board and is passed out of the gap of the outer ring.

5. The sensor device as claimed in claim 2, wherein the circuit board includes a power supply and sensor-electronic components connected electrically by conductor tracks.

6. The sensor device as claimed in claim 1, wherein said sensor device is configured to be fastened on the rolling bearing by an adhesive film.

7. The sensor device as claimed in claim 6, further comprising an adhesive film, wherein the adhesive film comprises a first circumferential portion in a region of the inner ring and a second circumferential portion in a region of the outer ring, and the first and second portions are connected to one another by a plurality of parting webs, wherein the parting webs are configured to break when there is a force acting in a circumferential direction.

8. The sensor device as claimed in claim 1, wherein the inner ring is embodied as a flinger disk.

9. A rolling bearing arrangement comprising a rolling bearing having an outer race and an inner race, which is rotatable relative to said outer race, and comprising a sensor device as claimed in claim 1, which is connected to the rolling bearing.

10. The sensor device as claimed in claim 1, wherein the sensor device is configured to allow movement of the c-shaped outer ring during an assembly process of the sensor device and rolling bearing within a receiving bore, the movement accommodating centering of the c-shaped outer ring relative to the receiving bore.

11. A rolling bearing arrangement, comprising:
    an outer race and an inner race that is rotatable relative to the outer race; and
    a sensor device, including:
       a sensor configured to connect to one of the outer race or the inner race in a manner fixed against relative rotation;
       a signal transmitter configured to connect to the other of the outer race or the inner race in a manner fixed against relative rotation;
       a c-shaped outer ring having opposing ends that define a gap, the outer ring attached to an end face of the outer race of the rolling bearing; and
       an inner ring attached to an end face of the inner race of the rolling bearing;
       wherein the sensor and the signal transmitter are arranged on mutually opposite lateral surfaces of the outer and inner rings.

12. The rolling bearing arrangement as claimed in claim 11, wherein the sensor is arranged on a flexible circuit board attached to the lateral surface of the outer or the inner ring.

13. The rolling bearing arrangement as claimed in claim 12, wherein the sensor device has a connection cable configured to connect to an evaluation unit, wherein the connection cable is fastened on the circuit board and is passed out of the gap of the outer ring.

14. The rolling bearing arrangement as claimed in claim 11, wherein the sensor device is configured to allow movement of the c-shaped outer ring during an assembly process of the sensor device and rolling bearing within a receiving bore, the movement accommodating centering of the c-shaped outer ring relative to the receiving bore.

15. The rolling bearing arrangement as claimed in claim 11, wherein the sensor device is configured to be fastened on the rolling bearing by an adhesive film.

16. The rolling bearing arrangement as claimed in claim 15, further comprising an adhesive film, wherein:
    the adhesive film comprises a first circumferential portion in a region of the inner ring and a second circumferential portion in a region of the outer ring; and
    the first and second portions are connected to one another by a plurality of parting webs;
    wherein the parting webs are configured to break when there is a force acting in a circumferential direction.

17. A rolling bearing arrangement, comprising:
    an outer race and an inner race that is rotatable relative to the outer race; and,
    a sensor device, including:
       a sensor connected to one of the outer race or the inner race;
       a signal transmitter connected to the other of the outer race or the inner race;
       a c-shaped outer ring having opposing ends that define a first installation gap, the c-shaped outer ring attached to an end face of the outer race of the rolling bearing, defining a first attachment; and,
       an inner ring attached to an end face of the inner race, defining a second attachment; and:
          the sensor and the signal transmitter are arranged on mutually opposite lateral surfaces of the outer and inner rings; and, the first attachment configured to allow movement of the c-shaped outer ring relative to the rolling bearing during an assembly process of the rolling bearing arrangement within a receiving bore, the movement accommodating centering of the c-shaped outer ring relative to the receiving bore and defining a second installation gap, smaller than the first installation gap.

18. The rolling bearing arrangement of claim 17, wherein the first attachment includes an adhesive film arranged between the outer ring and the end face of the outer race.

19. The rolling bearing arrangement of claim 17, wherein the second attachment includes an adhesive film arranged between the inner ring and the end face of the inner race.

20. The rolling bearing arrangement of claim 17, wherein the second attachment is configured to allow movement of the inner ring relative to the rolling bearing during an assembly process of the rolling bearing arrangement on a receiving shaft, the movement accommodating centering of the inner ring relative to the receiving shaft.

* * * * *